United States Patent [19]

Zeitrag

[11] 4,280,216
[45] Jul. 21, 1981

[54] METHOD OF MAKING CONFERENCE CALL CONNECTIONS IN A MULTIPLEX SWITCHING SYSTEM

[75] Inventor: Rolf Zeitrag, Munich, Fed. Rep. of Germany

[73] Assignee: Siemens Aktiengesellschaft, Berlin & Munich, Fed. Rep. of Germany

[21] Appl. No.: 19,705

[22] Filed: Mar. 12, 1979

[30] Foreign Application Priority Data

Mar. 16, 1978 [DE] Fed. Rep. of Germany ....... 2811466

[51] Int. Cl.³ .......................................... H04M 3/56
[52] U.S. Cl. ................................................ 370/62
[58] Field of Search ...................... 179/18 BC, 1 CN; 370/62

[56] References Cited

U.S. PATENT DOCUMENTS

| | | | |
|---|---|---|---|
| 3,551,600 | 12/1970 | Berch | 179/18 BC |
| 3,692,947 | 9/1972 | Lewis | 179/18 BC |
| 3,699,264 | 10/1972 | Pitroda et al. | 179/18 BC |
| 4,119,807 | 10/1978 | Nahay | 179/18 BC |
| 4,126,766 | 11/1978 | McLaughlin et al. | 179/18 BC |

Primary Examiner—Thomas W. Brown
Attorney, Agent, or Firm—Hill, Van Santen, Steadman, Chiara & Simpson

[57] ABSTRACT

A method for making connections for conference calls in a PCM time division multiplex switching system incorporates the steps of adding, during each pulse frame, code words received from subscribers to each conference call, and storing code words representative of the intermediate sums resulting from such addition in a conference call memory. The code word representative of the total sum accumulated, for each conference call, during the preceding pulse frame is read out to each of the subscribers of each respective conference call, during his respective time slot, with the optional subtraction of the code word received from each subscriber before the total sum is transmitted to him. When subscribers to a conference call have consecutive time slots, the conference call memory is bypassed for the generation of the intermediate sum.

5 Claims, 2 Drawing Figures

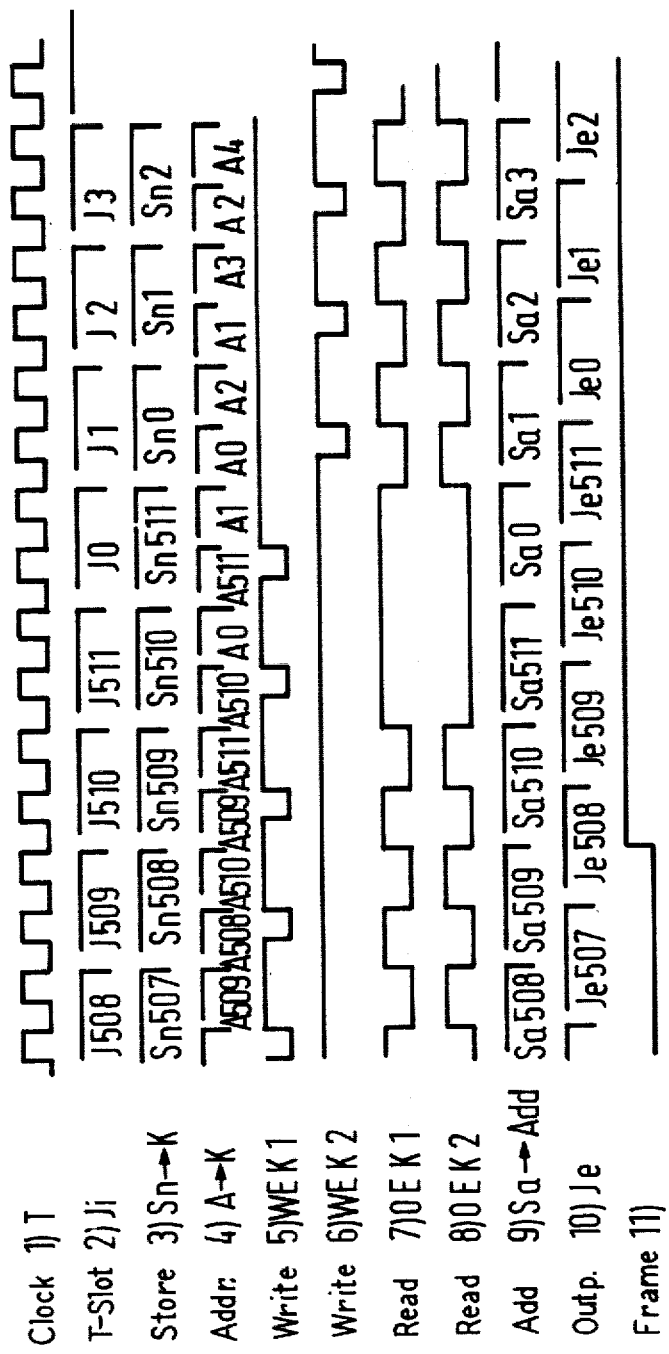

METHOD OF MAKING CONFERENCE CALL CONNECTIONS IN A MULTIPLEX SWITCHING SYSTEM

BACKGROUND

1. Field of the Invention

The present invention relates to a method for making connections for conference calls, and more particularly to such a method used in connection with a PCM time division multiplex switching system for a communications network.

2. The Prior Art

Communication systems including pulse code modulation (PCM) time division multiplex switching employ systems which define sequential pulse frames, each of which are subdivided into a plurality of time slots. Each of the time slots is devoted to an individual communication unit, such as a telephone line or other transmission line. The amplitude of a signal on the line is sampled during its respective time slot, and a digital representation of this amplitude is made available to one or more other lines, during the time slots allocated to them. Sampling of the individual transmission lines, during their respective time slots, produces digital code words, which are handled by digital processing apparatus with great speed. Conference calls are handled in some existing systems by summing a plurality of message samples and reading out the sums to the conference participants. Such systems have not provided, however, for conference calls involving subscribers having adjacent time slots.

BRIEF DESCRIPTION OF THE PRESENT INVENTION

The present invention provides a method of making conference call connections in a PCM time division multiplex switching system. In accordance with the present invention, the code words which are received from the conference call subscribers are summed, as each is received, in an adder, to form intermediate sum code words, which words are stored in a conference call memory. The intermediate sums are summed with subsequent code words from other conference call subscribers to form a total sum code word. The total sum code word may be diminished by the code word received from each subscriber as that subscriber receives the total sum code word, if necessary. The invention provides a two-part conference call memory for alternately storing the intermediate sum code words and for making the total sum code words available to the conference call subscribers. During alternate pulse frames, the function of the two parts of the conference call memory are exchanged.

In the process of the present invention, the memory cells or locations of the conference call memory are addressed twice during each time slot. During one access in each time slot, the intermediate sum code word is read from the memory, and during a second time, the updated intermediate sum code word is written into the memory, after having been added to a further PCM code word received from a conference call subscriber.

The present invention avoids difficulties which may arise when two conference call subscribers are assigned consecutive time slots, as well as other difficulties.

In accordance with one embodiment of the present invention, a storage register is provided for introducing a compensating time interval for separating the functions of updating the intermediate sum code word, and storing the updated code word. The memory cells of one half of the conference call memory for a given time slot have their reading and writing functions separated by at least one bit time interval, and this is coordinated with the reading of the total sum code words from the other half of the conference call memory. When subscribers to the same conference call have consecutive time slots, the code word derived from the addition of an intermediate sum code word with a newly received code word, bypasses the storage register.

The storage register interposed between the adder and the conference call memory, and a second storage register interposed between the conference call memory and the adder allow for compensation of time differences. Means is provided for preventing the simultaneous reading and writing of the same memory cell, or from providing overlapping outputs read from the memory. Accordingly, it is possible to provide for conference call subscribers being assigned consecutive time slots, by bypassing both storage registers.

In accordance with a further embodiment of the present invention, the intermediate sum code word is supplied to the conference call memory from the adder, in each case, and is overwritten into the appropriate memory cell.

In yet another embodiment of the present invention, at the beginning of each new pulse frame, a different bit is entered into a memory location allocated to corresponding memory locations in the two parts of the conference call memory. This bit is read out with the intermediate sum code word, and is compared with a corresponding bit identifying the current pulse frame. When such bits are not equal, the code word received from a subscriber during the time slot is forwarded to the conference call memory directly without being augmented. In this way, the code word from the conference call subscriber who is assigned the first time slot for any conference call, is not added to the earlier intermediate sum, but instead begins formation of a new intermediate sum.

BRIEF DESCRIPTION OF THE DRAWINGS

Reference will now be made to the accompanying drawings in which:

FIG. 2 is a pulse diagram illustrating the time relationships of operation of the various components of FIG. 1.

Referring now to FIG. 1, a block diagram of the system for carrying out the method of the present invention is illustrated. A conference call memory is provided with memory locations or cells divided into two parts identified as K1 and K2 in FIG. 1. During alternate pulse frames, an intermediate sum is accumulated in storage locations of K1 while the code word representative of the total sum accumulated during the previous pulse frame is read out from K2 through a register R2 to the SMe output 13. During the other alternate pulse frames, storage locations in the memory part K2 accumulate the intermediate sum, while the total sum accumulated during the previous pulse frame is read out from K1 through register R2.

Figure 1:
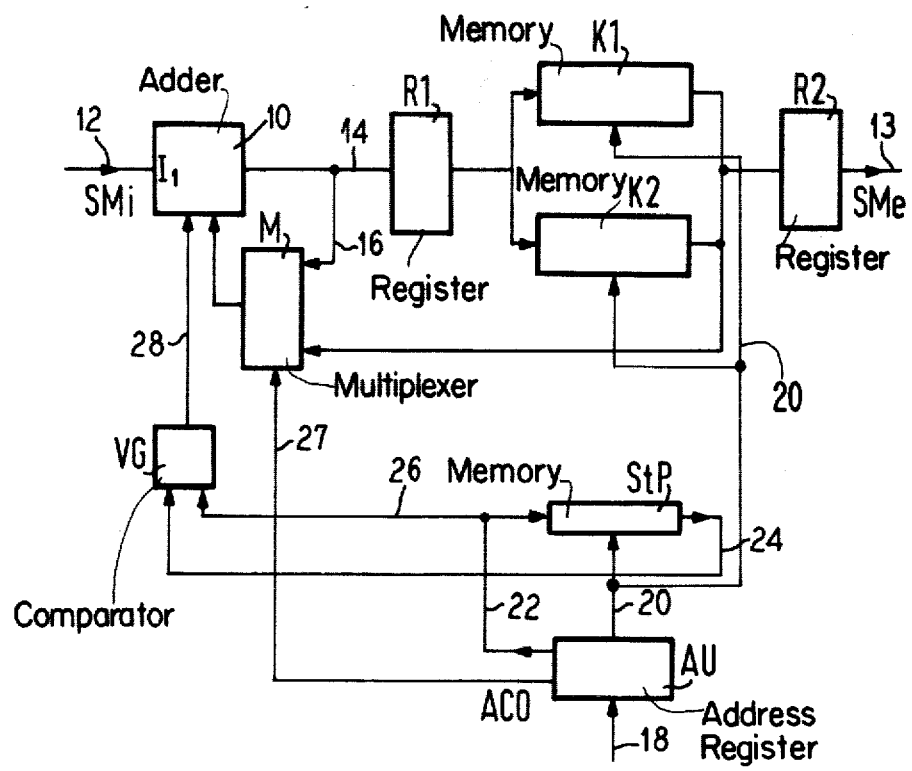
FIG. 1 is a functional block diagram of a circuit arrangement for implementing the process of the present invention.

Accumulation of the intermediate sum is accomplished by the adder unit 10, which receives one code word input from an Smi input line 12 and another input from a multiplexer M. The multiplexer M contains a storage register and receives an intermediate sum code word from one of the sections K1 and K2 of the conference call memory. The updated intermediate sum is supplied over a line 14 to a storage register R1, from which it is written into the appropriate section K1 or K2 of the conference call memory, overwriting the contents previously stored therein.

The multiplexer M can also receive and store data from the output of the adder 10 over a line 16, when conference call subscribers are assigned adjacent time slots, as described in more detail hereinafter.

The conference call memory contains a control section StP, which has a one bit storage location corresponding to each storage location of the parts K1 and K2 of the conference call memory. The StP memory will be referred to as a control memory, for the bit stored therein determines the function of the adder 10.

An address register AU is provided for receiving address selection signals over a line 18, which identify the addresses of storage locations in the conference call memory which are assigned to a given conference call. The address register AU selects corresponding storage locations of all of the parts of the conference call memory, indicated diagrammatically in FIG. 1 by the line 20 interconnecting the address register AU to the parts K1, K2 and StP of the conference call memory.

The address register AU also provides, on a line 22, an indication of the current pulse frame, with a signal on the line 22 changing between one significance and zero significance for alternate pulse frames. This bit is stored in the appropriate location of the control memory StP at the conclusion of each time slot. The previously stored content of the control memory StP is manifested on a line 24 which is connected to the one input of a comparator VG. The other input of the comparator VG is received from the address register AU over lines 22 and 26, so that the output of the comparator VG indicates whether the previously stored content of the control memory StP was written during the same pulse frame, or during a preceding pulse frame.

The output of the comparator VG is connected to a control input of the adder 10 over a line 28, to control operation of the adder 10. If the output of the comparator VG indicates an equality, the adder 10 is controlled to add the intermediate sum stored in the multiplexer M to the incoming pulse code arriving from a subscriber over the line 12, and pass the updated intermediate sum to the line 14. If the output of the comparator VG indicates a non-comparison, the incoming line 12 is connected directly to the line 14, and addition is not performed.

It will be understood that in the illustration of FIG. 1, the single lines which illustrate the incoming lines for the incoming pulse code, and the lines for handling the incoming code word, the intermediate sum code words, and the total sum code words, are merely illustrative of a plurality of lines which are required for parallel bit representation. In actuality, each of the lines for handling the code words has as many parallel bit lines as is required to identify, in an appropriate binary code, the various code words. It is also apparent that the lines 18 and 20 are representative of as many parallel bit lines as may be required.

In a preferred embodiment, 512 time slots are provided in each pulse frame, and the conference call memory has 256 storage locations in each of its three parts, because 256 is the maximum number of conference calls which can occur within 512 time slots.

In operation, a pulse code word is received on the line 12, and is added by the adder 10 to a previously stored intermediate sum code word, stored in one of the two parts K1 or K2, which is received at the second input of the adder 10 from the multiplexer M. The resulting sum is stored in register R1, and subsequently overwritten to the appropriate storage location of the memory part K1 or K2 which is serving as the intermediate sum accumulator. The register R1 effects a delay of at least one bit time interval.

During alternate pulse frames, the memory part K1 serves to accumulate intermediate sums, while the memory part K2 stores the total sum code words accumulated during the previous pulse frame, and vice versa. The total sum code words are read out through a register R2 to the SMe output line 13, from which it is made available to the conference call subscribers. The particular function served by the parts K1 and K2 is determined by the frame-identifying bit on the line 22.

The multiplexer M contains a register which functions to store data received either from one of the two parts of the conference call memory K1 or K2, of from the adder unit 10 over the line 16. This data is delayed by at least one bit time interval, and then made available to the output of the multiplexer.

The multiplexer M is controlled to store, and pass on to the adder unit 10, one of these two code words, (from the adder unit or from the conference call memory) in response to a signal on the line 27 from the address register AU. Normally, the line 27 will have a signal which causes the multiplexer M to store the intermediate sum code from the memory.

Referring to FIG. 2, line 1 illustrates the clock signal consisting of bit pulses T, which time operation of the apparatus of FIG. 1. The pulse repetition rate of the bit pulse if preferably about 8 Mhz. Line 2 of FIG. 2 illustrates the time slots, J508, J509, etc., and shows that each time slot lasts for two clock cycles of the bit pulses T.

Line 3 of FIG. 2 shows the sequence at which sums are made available from the adder unit 10, through the register R1 to the conference call memory parts K1 and K2, and shows how the introduction of the intermediate sum into the conference call memory is delayed by one time slot or two cycles of the bit pulse T.

Line 4 of FIG. 2 illustrates the times at which the conference call memory is addressed, the numbers indicating the corresponding time slots. For example, the storage location for the conference call to which a subscriber has time slot J508 is accessed during the first clock cycle of time slot J509. The select input is received over the line 18, to select corresponding storage locations within the conference call memory. Lines 5 and 6 of FIG. 2 illustrate the sequence in which write commands are supplied to the conference call memory parts K1 and K2, the two parts being adapted for writing intermediate sum code words during alternate pulse frames, beginning with the sum written to the storage location for the conference call to which time slot 0 is a subscriber. Lines 7 and 8 of FIG. 2 illustrate the sequence of read control signals applied to the parts K1 and K2 of the conference call memory.

Line 9 of FIG. 2 illustrates the sequence with which the multiplexer unit M supplies intermediate sums to the adder unit 10. It is apparent that a sum for a given time slot is supplied to the adder at the same time that the incoming code word arrives for the same time slot.

Line 10 of FIG. 2 illustrates the times at which the total sum code words are made available to the various time slots, and line 11 indicates the change in the bit significance for the end of one pulse frame and the beginning of the succeeding pulse frame. The level on the line 11 of FIG. 2 changes at the beginning of time slot J510.

Assuming that a conference call subscriber has time slot No. 509, the pulse code word during that time slot is represented as J509 in FIG. 2. During the first half of that time slot, an address select signal appears on the line 18, which identifies the storage location corresponding to the conference call for time slot 508. The intermediate sum corresponding to the time slot 509 conference call is, however, already stored in the register embodied in the multiplexer M. Assuming that this conference call is not accessed for the first time during a given pulse frame during time slot 509, the output of the control memory on line 24 (which corresponds to the conference call for time slot 509) will be the same as the output from the address register on lines 22 and 26, with the result that the adder 10 will be conditioned to add the incoming pulse code to the intermediate sum pulse code stored in the multiplexer M. The sum is produced on the line 14 and stored in the register R1. During the subsequent time slot, as shown in line 3 of FIG. 2, this intermediate sum Sn509 is written into part K1 of the conference call memory, simultaneously erasing or overwriting the obsolete intermediate sum.

At the conclusion of the writing during time slot 509, the storage location for the conference call for time slot 510 is accessed, and part K1 of the memory is read out (FIG. 2, line 7), resulting in the setting of the register in the multiplexer M. During the following clock cycle, the storage location assigned to the conference call for time slot 509 is accessed, and the total sum code word for this conference call is read out from memory part K2, resulting in the output of the total sum JE509 to the system (FIG. 2, line 10). The register R2 continues to manifest the total sum code word for one time slot interval.

When another time slot such as time slot 511 is not assigned to the same conference call, the operation described above is repeated for time slot 511. The incoming PCM word during the time slot 511 is added to the earlier intermediate sum code word, stored in K1, and the new intermediate sum is written into memory part K1. The total sum code word stored in K2 is read out to the output line 13 in the same manner for each time slot.

If desired, the total sum code word may be diminished by the code word last received from the subscriber to whom the code word is being furnished. In that way, each subscriber receives a signal corresponding to the sum of signals received from all of the other subscribers to the conference call, but not the signal which that subscriber himself generated. In that event, a subtraction station is provided, having its input connected to the line 13 and its output connected to the subscribers by suitable multiplexing apparatus. The specific mechanism of the subtraction apparatus will not be described in detail because it is merely an optional feature which may or may not be included with the features of the present invention.

At the beginning of each succeeding pulse frame, the function of the parts K1 and K2 are interchanged, but otherwise the operation described above is repeated for the various time slots assigned to the same conference call. The first time slot assigned to each conference call, which arrives after a change in the pulse frame, results in a different signal being produced by the comparator VG, as the result of the change in the signal present on line 22. This causes the adder 10 to perform no addition, but to instead supply the pulse code arriving on line 12 directly to the line 14. This results in its being written into the appropriate part of the conference call memory as the first component of a new intermediate sum code word. The old total sum code word is erased or overwritten in the process. At the end of that time slot, the control memory StP is written with the new pulse frame designator, so that for subsequent time slots associated with the same conference call, the output on the line 24 is the same as that on the line 22, until the pulse frame changes again. In this way, obsolete total sum code words are erased, and a new intermediate sum is begun, with every change in the pulse frame.

When conference call subscribers are assigned adjacent time slots, it is not possible to derive an intermediate sum code word from the comference call memory, because of the delay introduced by the storage register R1. Therefore, in this situation, the intermediate sum arrives at the multiplexer M over the line 16 directly from the adder, instead of from the conference call memory. The multiplexer is controlled by a signal over the line 27 to accomplish this, when the same address is supplied to the line 18 for consecutive time slots. In this way, the register R1 and the conference call memory are short-circuited, and the adder 10 operates to sum consecutive pulse code words arriving on the line 12. The result is supplied to the register R1 in the normal way, and overwrites the obsolete intermediate sum code word previously stored in the conference call memory.

As shown in FIG. 2, the conference call memory is addressed twice during each time slot, during successive clock cycles of the bit pulses T. During a first clock cycle, when time slot J509 is being received, for example, the conference call memory assigned to time slot 508 is addressed, and during the next clock cycle, the conference call memory assigned to time slot 510 is addressed. During the following two clock cycles, during time slot J510, the storage locations assigned to time slots 509 and 511 are addressed respectively. At the end of the first addressing period during each time slot, at the falling edge of the T pulses, the register R2 is set. At the end of each time slot, the register R1 and the multiplexer M are set. For example, during time slot 509, at the end of the first clock cycle, during which the storage location assigned to time slot 508 was addressed, register R2 is set in accordance with the data read out from the memory part K2. Also, during the last one-half of the cycle, memory part K1 is written with data corresponding to the intermediate sum for time slot 508, stored in register R1. At the end of the next clock pulse cycle, during which the storage location assigned to time slot 510 is addressed, the register within the multiplexer M is set with the data read out from memory part K1, and register R1 is set in accordance with the output of the adder, which manifests the updated intermediate sum for time slot 509. Each of the various registers continues to manifest its content at its output, until it is again set.

It is apparent from FIG. 2 that as long as the pulse frame signal on line 11 is low, K2 is read out to said register R2, and K1 is read out to the multiplexer M. At the beginning of time slot 510, however, the pulse frame signal on the line 11 goes high, and this causes the signal on line 8, controlling the reading of memory part K2, to remain low for four addressing cycles. During these four addressing cycles, the contents of various storage locatios of K2 are read out successively to register R2 and to the register within the multiplexer M, since the setting times of the various registers are not affected by the phase of the pulse frame. During these four addressing cycles, the storage location assigned to time slot 510 is read to R2; the storage location assigned to time slot 0 is read to the multiplexer; then the storage location assigned to time slot 511 is read to register R2; and finally, the storage location assigned to time slot 1 is read to the multiplexer M. Afterwards, register R2 is set from storage locations accessed during the first half of each time slot, and the multiplexer is set with the data read from storage locations accessed during the second half of each time slot. It can be seen that this reverses the functions of the parts K1 and K2 of the conference call memory. This causes storage locations corresponding to consecutive time slots up to No. 511 to be read from memory part K1 to the multiplexer, at the end of each time slot, after which, beginning at the end of time slot 511, storage locations corresponding to time slots beginning with 0 are read from memory part K2 to the multiplexer. Similarly, storage locations corresponding to all of the time slots through a time slot 511 are read from memory part K2 to register R2, at about the middle of each time slot, after which storage locations beginning with that assigned to time slot 0 are read from memory part K1 to the register R2.

Conventional logic units may be used for altering the pulse frames shown on lines 5–8 in response to the change in the phase as shown in line 11 of FIG. 2. For example, two D-type flip-flops may be used, one for directing read control signals to either K1 or K2 for the first clock cycle of each time slot, and the other for directing read control signals to either K1 or K2 during the second clock cycle of each time slot. The pulse frame input would be connected to the D inputs of both flip-flops, and the clock inputs would be triggered at the beginning of time slot J1 and J511, respectively. The pulse frame indication changes at the beginning of time slot 510, to allow ample time for the logic to bring about the required alterations in the pulse frames.

As the blocks illustrated in FIG. 1 are representative of conventional modular units which are commercially available from a number of sources, and are well known to those skilled in the art, they need not be described in detail.

It will be appreciated that various modifications and additions may be made in the present invention without departing from the novel features thereof, which are intended to be defined and secured by the appended claims.

What is claimed is:

1. A method for completing conference call connections in a PCM division multiplex switching system having successive pulse frames each separated into plural time slots, comprising the steps of:

(a) forming an intermediate sum code word by adding code words received from subscribers to a conference call during their respective time slots, (b) storing said intermediate sum code word by writing it into a first section of a conference call memory, (c) reading out the intermediate sum code word from the conference call memory for each time slot of a conference call subscriber, (d) storing the total sum code word in a second section of said conference call memory, said total sum code word representing the sum of all of the subscriber code words received during the previous pulse frame, (e) reading out said total sum code word during the time slots assigned to subscribers of the conference call, (f) interchanging the functions of said first and second memory sections during alternate pulse frames, (g) introducing a delay between the reading out of an intermediate sum code word and formation of a new intermediate sum code word, (h) introducing a delay between forming a new intermediate sum code word and storing it in the conference call memory, (i) separating the reading and writing functions of said first and second sections of said conference call memory, and (j) when conference call subscribers have consecutive time slots, omitting the delay interposed between formation of an intermediate sum code word and reading or writing of said conference call memory, whereby said intermediate sum is accumulated directly from code words received during consecutive time slots.

2. The method according to claim 1, wherein said code words are manifested in bit-parallel manner.

3. The method according to claim 1, including the steps of writing an intermediate sum, which is accumulated directly from code words received during consecutive time slots, into said conference call memory, inhibiting such intermediate sum from being added to, and overwriting such intermediate sum in said conference call memory with a new intermediate sum when subscribers to the conference call corresponding to said intermediate sum have consecutive time slots.

4. The method according to claim 1, wherein said first and second memory sections are read at different times during said time slots.

5. The method according to claim 1, including the steps of storing in said conference call memory bits identifying alternate pulse frames at storage locations corresponding to coordinated storage locations of said first and second sections of said conference call memory, said bits being stored during the writing of an intermediate sum code word and being read out together with said intermediate sum code word, comparing the bit read out with the intermediate sum code word with a bit of the current pulse frame, and storing the code word being received in response to an inequality as a new intermediate sum, without adding the existing intermediate sum.

* * * * *